No. 758,162. PATENTED APR. 26, 1904.
W. WINKEL.
BUTTON FOR PLANTER CHECK LINES.
APPLICATION FILED FEB. 9, 1904.

NO MODEL.

Inventor
Wendelin Winkel

Witnesses
By
R. S. & A. B. Lacey, Attorneys

No. 758,162.

Patented April 26, 1904.

UNITED STATES PATENT OFFICE.

WENDELIN WINKEL, OF SAN JOSE, ILLINOIS.

BUTTON FOR PLANTER CHECK-LINES.

SPECIFICATION forming part of Letters Patent No. 758,162, dated April 26, 1904.

Application filed February 9, 1904. Serial No. 192,800. (No model.)

*To all whom it may concern:*

Be it known that I, WENDELIN WINKEL, a citizen of the United States, residing at San Jose, in the county of Mason and State of Illinois, have invented certain new and useful Improvements in Buttons for Planter Check-Lines, of which the following is a specification.

In operating planter mechanism by check-lines to insure accurate spacing and alining of the plants considerable difficulty has been experienced where wire constitutes the runner-line and the buttons are made fast upon the line by wrapping the wire about the same, due, chiefly, to two causes: first, the rapid wearing away of the forks at the crotch by the wraps of the wire striking the inner ends of the fork-tines and, secondly, by the sticking of the buttons in the forks, attributable mainly to the wraps of the wire catching upon the fork-tines.

This invention has for its object to provide a planter check-line free from the objections herein noted and from others traceable to the projecting of the wraps beyond the sides of the check-line buttons.

This invention provides a button for planter check-lines having a passage for the line and a reduced portion for the line to wrap about to fix the position of the button, and yet have the wraps come wholly within the confines of the button, so as not to come in contact with the fork or other operating part of the planter mechanism.

A further purpose of the invention is to utilize the button or the reduced part thereof as means for coupling sections of the check-line when the same is composed of a number of parts, thereby allowing the check-line to be lengthened or shortened, as may be required, according to the length of the field or the part to be planted.

The improvement further consists of the novel features, details of construction, and combinations of parts, which hereinafter will be more particularly described, illustrated, and finally claimed.

Figure 1:
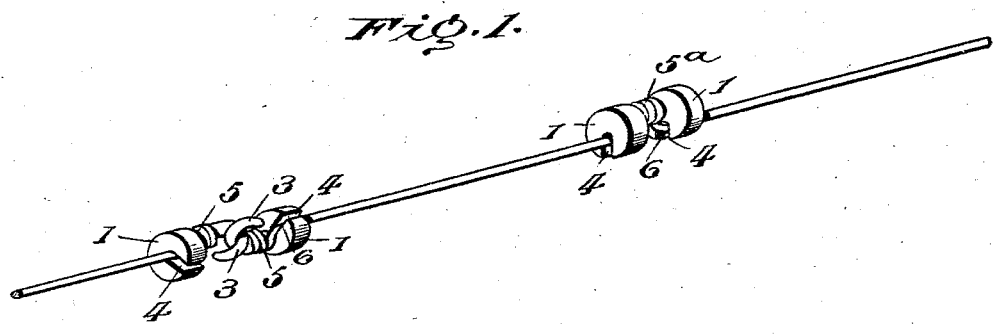
Figure 2:
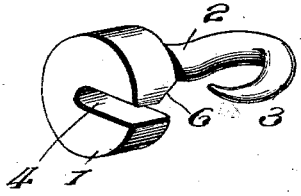
Figure 3:
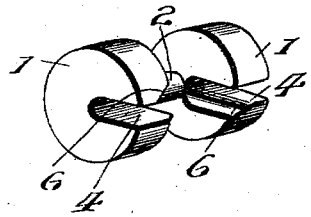
Figure 4:
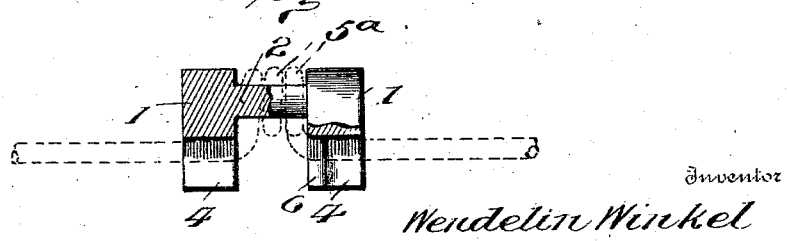

In the drawings hereto attached and forming a part of the specification, Figure 1 is a perspective view of a portion of a check-line embodying the invention. Fig. 2 is a detail perspective view of the form of button having the reduced portion formed into a hook for coupling sections of the check-line. Fig. 3 is a perspective view of a modified form of button applied to the check-line intermediate of its ends. Fig. 4 is a side view of the modification shown in Fig. 3, having parts broken away, illustrating the relative position of the check-line by dotted lines.

Corresponding and like parts are referred to in the following description and indicated in all the views of the drawings by the same reference characters.

The body of the button is indicated at 1 and may consist of a single part, as shown most clearly in Fig. 2, or two parts, as indicated most clearly in Fig. 3, the same being spaced apart and connected by the reduced portion 2, which is preferably an integral part of the button, or may be separate from and applied thereto in any determinate way.

The form of button shown in Fig. 2 and at the left hand of Fig. 1 has the reduced portion terminating in a hook 3, which is utilized as coupling means for connecting sections of the check-line when the latter is composed of a number of parts. Inasmuch as this form of button is used at the end of the check-line or a length thereof the passage 4 preferably consists of an opening through which the end portion of the check-line is inserted preliminary to wrapping the terminal portion about the reduced part 2, as shown most clearly at 5 in Fig. 1. The inner end of the opening or passage 4 is about centrally disposed, and the reduced part 2 is arranged to one side of the center or opening, so as not to obstruct the passage of the wire or line. The end portion of the wire when wrapped about the reduced part 2 does not project beyond the side of the button, thereby preventing contact thereof with the operating part of the planter mechanism. The reduced part with the hooked terminal constitutes a wire-engaging extension and may be an integral part of the button or applied thereto, as found most convenient to manufacture.

The form of button illustrated at the right hand of Fig. 1 and in Figs. 3 and 4 comprises spaced portions united by the reduced part 2 and having the passage or opening 4. By having the passages 4 open through a side of the button the latter may be applied to the check-line at any point in its length, thereby obviating the necessity of stringing the buttons upon the line or of constructing it in sections, so as to be fitted about and clamped to the line. This form of button has one part fitted to the line and the latter wrapped about the reduced part 2 and the projecting portion fitted into the passage of the other part. The wraps of the wire come between the parts, as indicated at 5ª in Figs. 1 and 4, and are positioned so as not to come in contact with the fork or other operating part of the planter mechanism with which the check-line may be used. The inner corner of the button is beveled, as shown at 6, to admit of the wire bending less sharply than would be required if the corner were left intact.

Having thus described the invention, what is claimed as new is—

1. A button for check-lines having its impacting-face square and having a passage extended outward through a side thereof, with its inner corner beveled, and having a reduced portion arranged at one side of the said passage for the check-line to wrap about, substantially as specified.

2. A button for check-lines comprising spaced parts having their outer ends square, passages in longitudinal alinement opening outward to corresponding sides of the said spaced parts and having inner diagonally-disposed corners beveled, and a connecting portion joining the said spaced parts and arranged opposite the inner ends of the said passages and in line therewith, substantially as specified.

In testimony whereof I affix my signature in presence of two witnesses.

WENDELIN WINKEL. [L. S.]

Witnesses:
FRED W. JACOBS,
LOUIS STREITMILLER.